Figure 1:
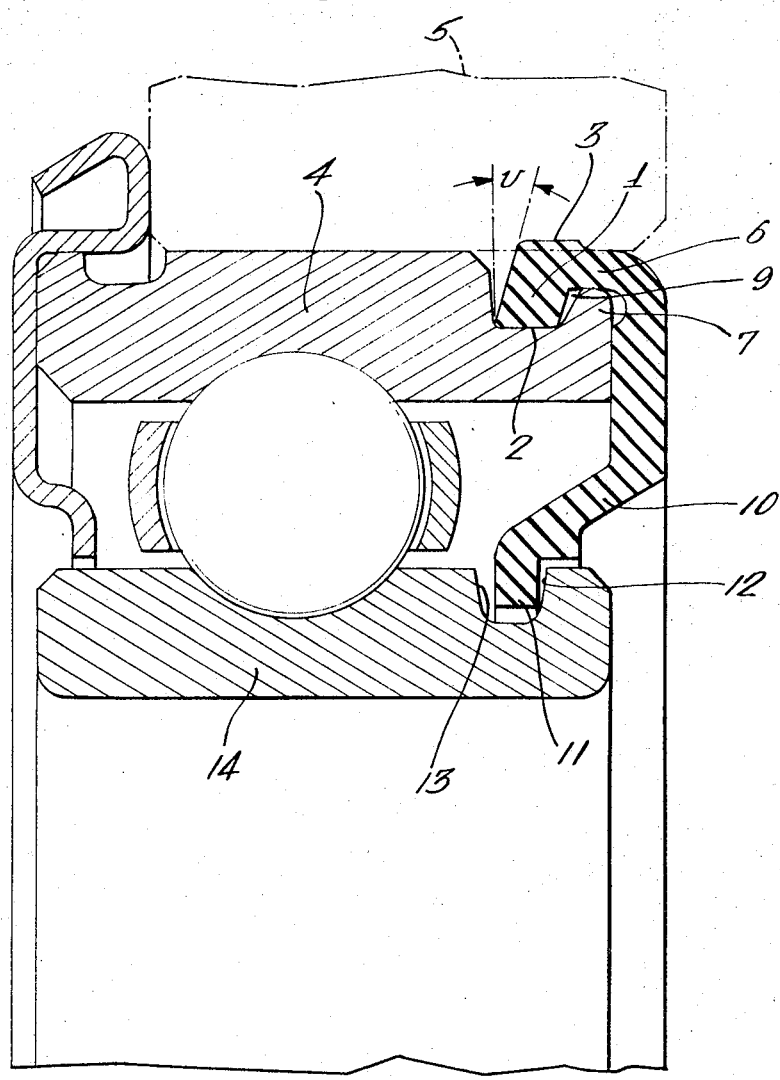

United States Patent

[11] 3,594,050

[72] Inventor Karl Evald Andreas Göthberg
  Lerum, Sweden
[21] Appl. No. 818,314
[22] Filed Apr. 22, 1969
[45] Patented July 20, 1971
[73] Assignee Aktiebolaget Svenska Kullagerfabriken
  Goteberg, Sweden
[32] Priority Apr. 22, 1968
[33] Sweden
[31] 5337/68

[54] MEANS FOR MOUNTING A BEARING ASSEMBLY IN A HOUSING
  12 Claims, 8 Drawing Figs.

[52] U.S. Cl. ........................................... 308/187.2
[51] Int. Cl. ........................................... F16c 33/78
[50] Field of Search .................................. 308/187.2; 64/17 A

[56] References Cited
UNITED STATES PATENTS
| | | | |
|---|---|---|---|
| 1,888,215 | 10/1932 | Bott | 308/187.2 |
| 1,895,167 | 1/1933 | Lighthall | 308/187.2 |
| 2,029,072 | 1/1936 | Hughes | 308/187.2 |
| 3,114,560 | 12/1963 | Dunn | 308/187.2 |
| 3,284,145 | 10/1966 | Bixby | 308/187.2 |

Primary Examiner—Mark Newman
Assistant Examiner—Randall Heald
Attorney—Howson and Howson ABSTRACT: The combination comprising a housing having an opening therein for mounting a bearing assembly, said bearing assembly including inner and outer radially spaced ring members, a plurality of rolling elements in the annular space between the ring members, and at least one cover member made of an elastic material at one axial end of the bearing adapted to seat the outer ring in said housing opening against relative rotation with respect to the housing, said cover member having an annular portion seating in a groove in the outer surface of the outer ring, a substantially cylindrical thinner portion connecting the annular portion to a planar sidewall of the cover, said annular portion being of a size and configuration to exert a radial pressure against the bearing housing and outer ring member, said annular portion having a first supporting surface engaging he the bearing housing and being axially displaced in relation to a second supporting surface engaging in the outer ring groove and being located nearer said one axial end of said bearing than said second supporting surface.

INVENTOR:
KARL EVALD ANDREAS GÖTHBERG
BY Howson & Howson
ATTYS.

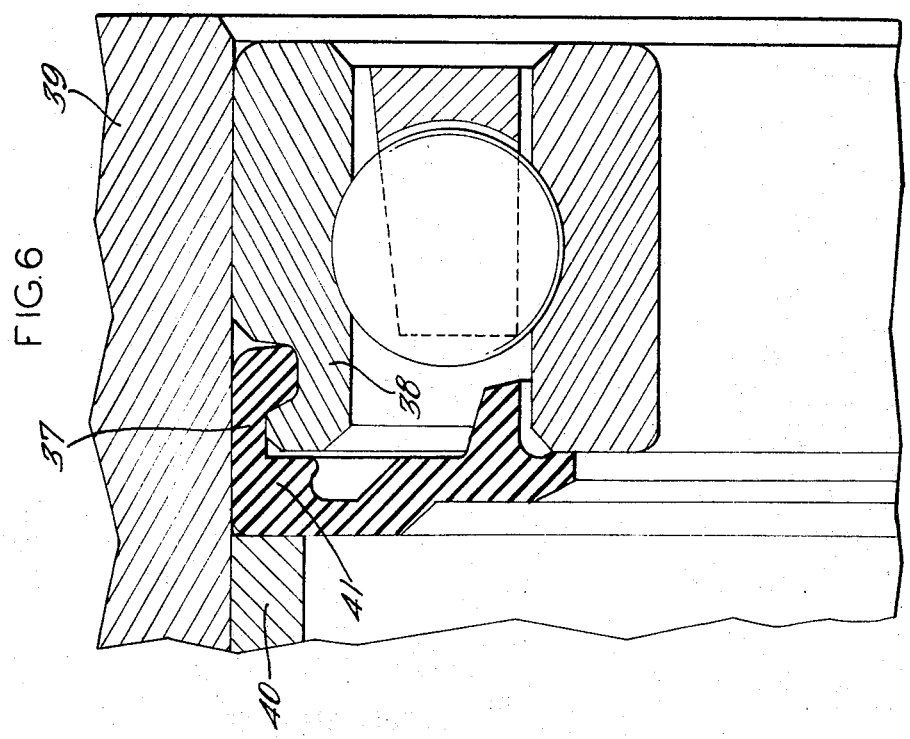
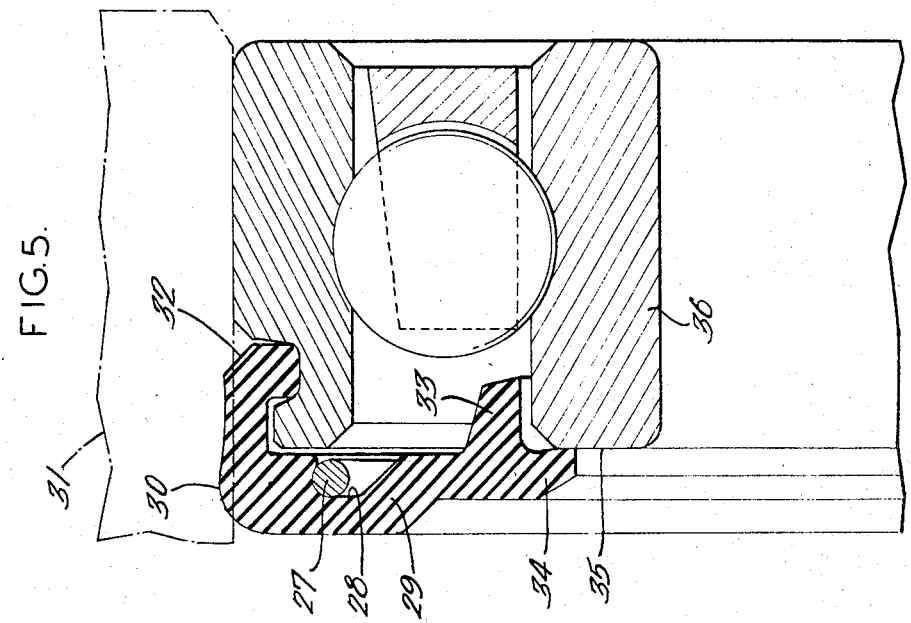

INVENTOR:
KARL EVALD ANDREAS GÖTHBERG
BY Howson & Howson
ATTYS.

MEANS FOR MOUNTING A BEARING ASSEMBLY IN A HOUSING

In assembling rolling bearings in for instance electric motors it is necessary to use such a loose fit in the housing that the outer race ring may adjust itself axially firstly dependent on the longitudinal tolerances of the engaged members of the motor and secondly on the longitudinal variations which appear when the motor is getting warm during operation. On the other hand there is always the risk in using a loose fit that the outer race ring will creep in the bearing seat if the direction of load is not stationary but rotating, which is common in such applications. To reduce this risk it is necessary to use very close tolerances in the bearing housing and this increases the manufacture costs. If the bearing housing is made of light metal which has a considerably higher coefficient of thermal expansion than steel, it is not even enough to use close tolerances.

The present invention represents a solution of those problems and involves a considerable reduction of the costs also, a very good sealing off of the bearing and a reduced risk that the bearing outer ring shall creep in the housing at for instance loose fit and rotating load direction. The outer edge of the cover acts in this case as an efficient brake on the bearing ring.

The invention will now be described more in detail in connection to the accompanying drawings of which FIGS. 1 to 8 show some embodiments of the sealing device for the rolling bearing unit according to the invention.

Figure 2:
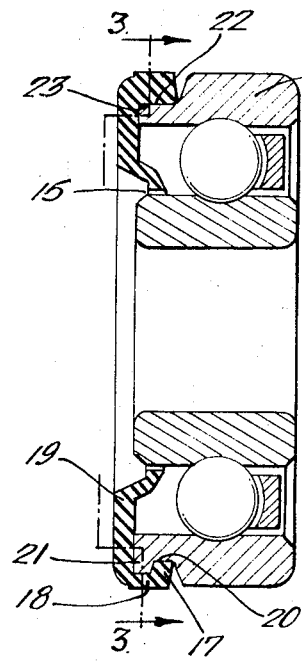
Figure 7:
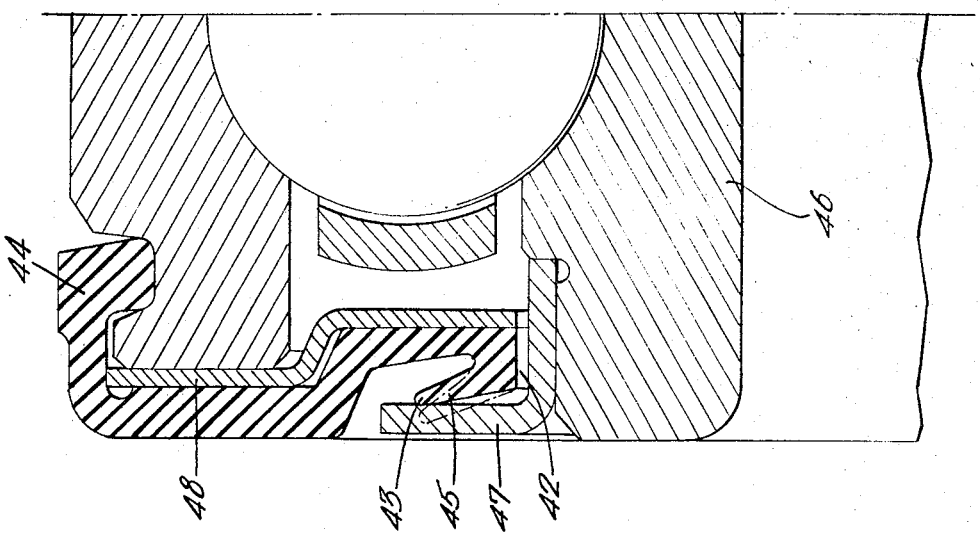

FIG. 1 shows a sealing cover of elastic material, having a fitting portion 1 and having a section in the form of an inclined parallelogram of the like, whereby the cylindrical surfaces 2 and 3 of the cover which contact a bearing ring 4 and a bearing housing 5, respectively are somewhat displaced axially in relation to each other. Thus the inner circumferential wall portion between the cylindrical supporting surfaces 2 and 3 is disposed at an angle $v$ to a plane extending transversely to the rotational axis of the bearing assembly. When the bearing is mounted in its housing the portion 1 will be deformed. Thereby the inclination angle $v$ of the portion will increase more or less depending partly on the diameter of the housing and partly on how far beyond the outer surface of the bearing the edge of the cover extends. Due to the tendency of the section to incline sideways when exerted to a pressure the variation in the pressure will be considerably less than if the portion 1 had been symmetrical, because of the tolerances of the contacting surfaces. A rubber rung having the section shown in the Figure may therefore if needed be made of a relatively hard plastics or rubber without risking that the contact pressures will be too high or too low. It would, however, hardly be possible to use a rubber ring comprising only the portion 1 for this purpose. The tendency of the portion 1 to increase its inclination angle $v$ at radial loads should be moderated by the aid of a substantially cylindrical portion 6 connected to the portion 1 and having a thinner section being connected to a sidewall 8 in its turn. There of course also should be certain spaces or plays 9 between the portions 1 and 6 and the bearing ring 4. A further stabilization of the portion 1 is attained if the portion 6 is allowed to rest against a flange 7 on the bearing ring 4. The flange 7 may alternatively be substituted by a loose sheet metal washer which rests against the end plane of the bearing ring and having a corresponding outer diameter. Such a washer is shown in FIG. 7. It is intended that the cover together with the inner ring 14 forms some sort of seal which shall prevent impurities from the surroundings to reach the inner of the bearing. FIG. 2 shows a simple slot seal 15.

The embodiment shown in FIG. 1 is characterized thereby that the cover fits in a groove in the inner ring. The plane sidewall 8 of the cover merges to a central, substantially tapered portion 10 which inwardly ends with a flange 11, which fits loosely in a groove having flanges 12 and 13, in the inner ring 14. Generally the flange 11 of the cover is not at all or only very lightly contacting one of the groove flanges 12 and 13. Together with the inner ring 14 it is thereby forming a narrow labyrinth-shaped slot which prevent impurities from the surroundings to reach the inner of the bearing. If a small positive pressure should appear on one side or the other of the elastic cover, the contact between the flange and one of the groove flanges will be increased and an increased sealing effect is attained.

A certain breaking moment is needed on the bearing outer ring to prevent this from creeping in the bearing housing, and this moment is generated by the friction between the elastic cover and the outer ring and the bearing housing, respectively.

The friction may if necessary be increased by a particular machining operation such as knurling of the surface of the ring and the housing which will contact the cover.

Figure 3:
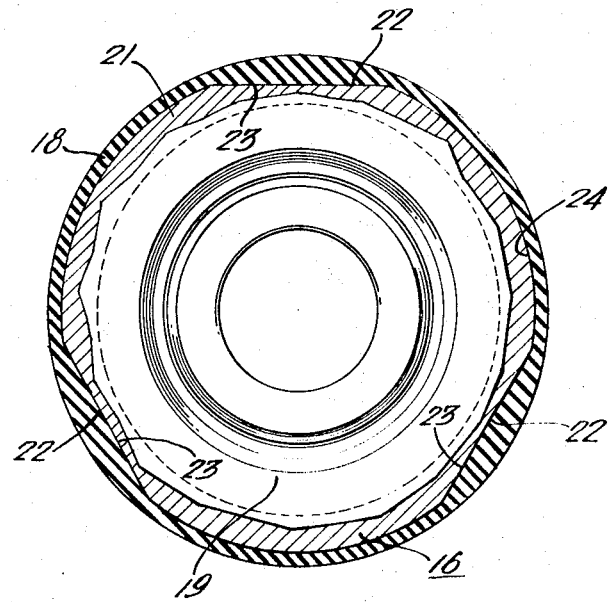
Figure 4:
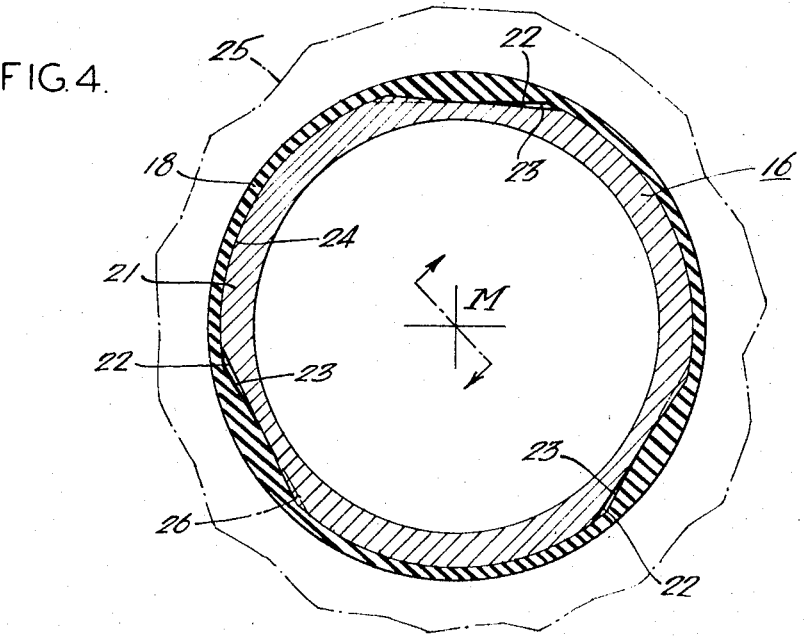

FIGS. 2 to 4 show another method of increasing the effect of the moment transmitting cover. In FIGS. 2 and 3 an outer ring of a ball bearing is designated 16 and 19 is a sidewall of an elastic sealing cover having a fitting portion 17, and a cylindrical thinner portion 18 which connects the portion 17 to the sidewall 19 of the cover. The portion 17 fits in a groove 20 in the outer ring 16, which also has a flange 21 supporting the portion 18 radially. In one or more locations, in FIGS. 3 and 4 three locations, material is removed from the flange 21 and the contiguous groove bottom to form a number of recesses or facets 22. In a corresponding number of locations 23 on the elastic cover the material has been reinforced so that contact between cover and bearing ring appears not only along the circular part 24 of the periphery but also along the other parts 22, 23. The bearing ring will thus be fitted with some sort of key grip in the surrounding rubber portion, which is supported radially by the bearing housing all around. The fit between bearing ring and the cover is suitable made somewhat looser than between cover and housing. A bearing load rotating in relation to the bearing housing causes by a loose fit a moment M, see FIG. 4, on the bearing ring 16 and rotates this in relation to the bearing housing 25. When the moment M is relatively small, the rotating movement is limited by the friction in the contact surfaces between the portion 18 and the bearing ring 16, 21 and the bearing housing 25, respectively. If the moment M is increased, it may, however, happen that the outer ring moves a small angle in relation to the bearing housing. The movement may be the result of a shear in the rubber portion or a sliding in the contact surfaces or a combination of these two. The flange 21 on the bearing ring will in any case rotate somewhat in relation to the cover, with the result that certain portions 26 of this are exposed to an increased pressure. Due to this increase in pressure the friction against the housing is also increased and in accordance therewith also the ability of the device to brake the bearing ring.

FIG. 5 shows an embodiment of the invention intended to be used in cases where there is reason to increase the friction between the cover and the bearing housing. The sidewall 29 of the elastic cover is provided with a groove 28 in which a spring 27, e.g. a round slotted wire ring, is applied in stressed condition. The steel spring expands the surrounding portion of the cover, so that an increased contact pressure between cover and bearing housing 31 appears along a zone 30. Moreover, the peripheral part of the cover defers from the previous embodiments thereby that it has a chamfer, 32, the task of which is to facilitate the inserting of the cover in the housing. The spring arrangement according to FIG. 5 may preferably be combined with earlier described arrangements according to FIGS. 2 to 4.

The central part of the cover in FIG. 5 is provided with a flange 33, enclosing the inner ring 36 without contacting the same, and a lip 34 which contacts the plane end 35 of the inner ring lightly. A good protection of the inner parts of the bearing is thus attained.

FIG. 6 shows an embodiment in which the pressure is increased and thereby also the friction between the elastic outer part 37 of the cover and a bearing ring 38 as well as a housing 39. By the aid of an axially displaceable ring 40, which may be actuated by a spring, the outer part 41 of the cover is loaded axially, which involves that the compressive stresses in the rubber material between bearing ring and housing are enhanced and the braking function is increased. In some cases the ring 40 may be substituted by a fixed step in the bearing housing located so in relation to the bearing that it will prestress the edge 41 of the cover.

FIG. 7 shows a cover of a type used when the bearing must be prevented from surrounding gases and liquids under pressure. The seal is a combination of a slot seal at 42 and a contacting lip seal at 43. The peripheral part 44 of the sealing cover is formed in principle as earlier described in connection to FIG. 1. The central portion of the cover is provided with a lip-shaped flange 45, which contacts a sheet metal collar 47 mounted on the inner ring 46 of the bearing. This collar acts simultaneously as a mechanical protection for the lip. A sheet metal washer 48 prevents the cover from striving inwards towards the bearing at an outer pressure and supports at its upper end the portion 44 of the sealing cover.

Figure 8:
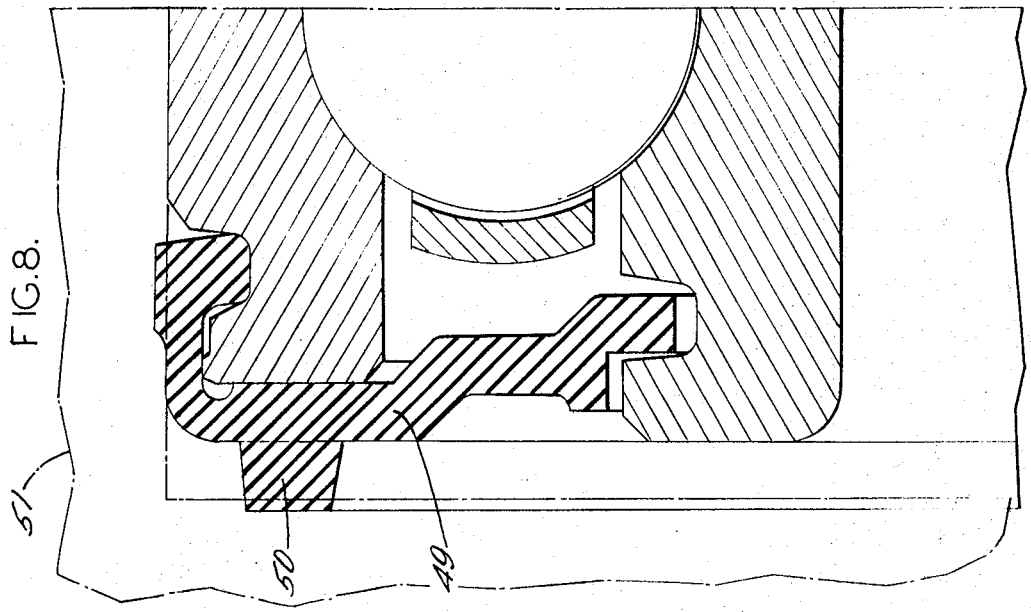

An elastic cover 49 according to the embodiment shown in FIG. 8 is provided with an axial flange 50, which transmits axial loads on the bearing to a bearing housing 51. The flange may be either in one piece or provided with recesses which make the flange more resilient.

Hereinbefore has only been described sealing covers of plastics or rubber intended for unilateral sealing off of a ball bearing. The invention may however be applied in different types of rolling bearings and also for such bearings having such covers on both sides.

I claim:
1. The combination comprising a housing having an opening therein for mounting a bearing assembly, said bearing assembly including inner and outer radially spaced ring members, a plurality of rolling elements in the annular space between the ring members, and at least one cover member made of an elastic material at one axial end of the bearing, said cover member having an annular portion adapted to seat in a groove in the outer surface of the outer ring, a substantially cylindrical thinner portion connecting the annular portion to the planar side wall of the cover, said annular portion being of a size and configuration to exert a radial pressure against the bearing housing, the circular flange formed in connection with the groove in the outer ring and the contiguous bottom of the groove being provided with at least one facet-shaped recess and the elastic cover fitting loosely around the flange and in the bottom of the groove being provided with material reinforcements which fit in said recess.

2. The combination comprising a housing having an opening therein for mounting a bearing assembly, said bearing assembly including inner and outer radially spaced ring members, a plurality of rolling elements in the annular space between the ring members, and at least one cover member made of an elastic material at one axial end of the bearing adapted to seat the outer ring against relative rotation with respect to the housing, said cover member having an annular portion seating in a groove in the outer surface of the outer ring, a substantially cylindrical thinner portion connecting the annular portion to a planar sidewall of the cover, said annular portion being of a size and configuration to exert a radial pressure against the bearing housing and outer ring member, said annular portion having a first supporting surface engaging the bearing housing and being axially displaced in relation to a second supporting surface engaging in the outer ring groove and being located nearer said one axial end of said bearing than said second supporting surface.

3. The combination as claimed in claim 2 wherein the annular portion of the cover is supported radially from the inside partly by the bottom of the groove in the outer surface of the ring and partly by the outer surface of a fixed flange located beside the groove.

4. The combination as claimed in claim 2 wherein the annular portion of the cover is supported radially from the inside partly by the bottom of the groove in the outer surface of the outer ring and partly by the outer surface of a loose washer located beside the groove.

5. The combination as claimed in claim 2 wherein the annular portion of the cover is supported radially from the inside, partly by the bottom of the groove in the outer surface of the outer ring and partly by annular expanding spring.

6. The combination as claimed in claim 2 wherein the annular portion of the cover is provided with an entering chamfer.

7. The combination as claimed in claim 2 wherein the inner circumferential wall portion between said first and second supporting surfaces is disposed at an angle to a plane extending transversely to the axis of the bearing assembly.

8. The combination as claimed in claim 2 wherein the sidewall of the cover terminates in a lip which contacts the surface of the inner ring member.

9. The combination as claimed in claim 2 wherein the sidewall of the cover terminates in a lip which engages in a groove in the outer surface of the inner ring member.

10. The combination as claimed in claim 2 wherein the housing includes a portion adapted to exert an axial pressure on the cover member thereby to increase the compression stresses in the annular portion of the cover.

11. The combination as claimed in claim 2 wherein the sidewall of the cover is provided with an axial flange adapted to engage the bearing housing thereby to transmit axial loads on the bearing to the bearing housing.

12. The combination as claimed in claim 2 wherein the sidewall of the cover is provided with a series of axially extending projections which serve to transmit forces axially between the bearing assembly and housing.